(12) United States Patent
Kulakofsky et al.

(10) Patent No.: US 8,240,377 B2
(45) Date of Patent: Aug. 14, 2012

(54) METHODS OF INTEGRATING ANALYSIS, AUTO-SEALING, AND SWELLABLE-PACKER ELEMENTS FOR A RELIABLE ANNULAR SEAL

(75) Inventors: David S. Kulakofsky, Katy, TX (US); Ronnie Faul, Katy, TX (US); William Hunter, The Woodlands, TX (US); Krishna M. Ravi, Kingwood, TX (US); Anthony Badalamenti, Katy, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 195 days.

(21) Appl. No.: 11/937,661

(22) Filed: Nov. 9, 2007

(65) Prior Publication Data

US 2009/0120640 A1    May 14, 2009

(51) Int. Cl.
*E21B 47/00* (2012.01)
(52) U.S. Cl. ............... 166/250.14; 166/285; 166/292
(58) Field of Classification Search ............ 166/250.14, 166/285, 292–295, 179, 122, 187, 277
See application file for complete search history.

(56) References Cited

U.S. PATENT DOCUMENTS

| | | | |
|---|---|---|---|
| 3,493,529 A * | 2/1970 | Eilers et al. ..................... 524/5 |
| 5,779,787 A | 7/1998 | Brothers et al. ............. 106/802 |
| 6,508,305 B1 | 1/2003 | Brannon et al. | |
| 6,565,644 B2 | 5/2003 | Kepler et al. ................. 106/713 |
| 6,697,738 B2 | 2/2004 | Ravi et al. | |
| 6,832,651 B2 | 12/2004 | Ravi et al. | |
| 6,922,637 B2 | 7/2005 | Ravi et al. | |
| 6,926,081 B2 | 8/2005 | Sweatman et al. | |
| 7,007,755 B2 | 3/2006 | Reddy et al. | |
| 7,036,586 B2 | 5/2006 | Roddy et al. | |
| 7,066,284 B2 | 6/2006 | Wylie et al. | |
| 7,133,778 B2 | 11/2006 | Ravi et al. | |
| 7,138,446 B2 | 11/2006 | Reddy et al. | |
| 7,143,828 B2 | 12/2006 | Reddy et al. ................. 166/294 |
| 7,143,832 B2 | 12/2006 | Freyer | |
| 7,156,174 B2 | 1/2007 | Roddy et al. | |
| 7,172,022 B2 | 2/2007 | Reddy et al. | |
| 7,225,879 B2 | 6/2007 | Wylie et al. | |
| 7,290,611 B2 | 11/2007 | Badalamenti et al. | |
| 7,294,194 B2 | 11/2007 | Reddy et al. ................. 106/724 |
| 7,296,597 B1 | 11/2007 | Freyer et al. ...................... 138/89 |

(Continued)

FOREIGN PATENT DOCUMENTS

EP        1778947 B1        2/2008

(Continued)

OTHER PUBLICATIONS

International Search Report and Written Opinion from PCT/GB2008/003536, dated Mar. 20, 2009.

(Continued)

*Primary Examiner* — Kenneth L Thompson
*Assistant Examiner* — Yong-Suk Ro
(74) *Attorney, Agent, or Firm* — Craig W. Roddy; Baker Botts LLP (57) ABSTRACT

A method of cementing involves introducing a pipe string into a well bore such that an annulus is defined between the pipe string and a wall of the well bore, and introducing a cement composition into the annulus. The cement composition includes cement, water, and an auto-sealing component. An annular structure, coupled to the pipe string, comprises an expandable material.

16 Claims, 6 Drawing Sheets

U.S. PATENT DOCUMENTS

| | | |
|---|---|---|
| 7,337,841 B2 | 3/2008 | Ravi .................... 166/285 |
| 7,341,117 B2 | 3/2008 | Wylie et al. |
| 7,571,777 B2 | 8/2009 | Wylie et al. |
| 2004/0144537 A1 | 7/2004 | Reddy et al. |
| 2004/0168802 A1 | 9/2004 | Creel et al. |
| 2004/0261990 A1 | 12/2004 | Bosma et al. |
| 2005/0061206 A1 | 3/2005 | Reddy et al. |
| 2005/0113262 A1 | 5/2005 | Ravi et al. |
| 2005/0199401 A1* | 9/2005 | Patel et al. .................... 166/387 |
| 2006/0086501 A1 | 4/2006 | Creel et al. |
| 2007/0012436 A1 | 1/2007 | Freyer .................... 166/179 |
| 2007/0017676 A1 | 1/2007 | Reddy et al. |
| 2007/0056735 A1 | 3/2007 | Bosma et al. |
| 2007/0137528 A1 | 6/2007 | Le Roy-Delage et al. .... 106/718 |
| 2007/0151484 A1 | 7/2007 | Reddy et al. |
| 2007/0151724 A1 | 7/2007 | Ohmer et al. .................. 166/187 |
| 2007/0204765 A1 | 9/2007 | Le Roy-Delage et al. .... 106/802 |
| 2007/0227734 A1 | 10/2007 | Freyer |
| 2007/0246225 A1 | 10/2007 | Hailey, Jr. et al. ............ 166/386 |
| 2007/0277979 A1 | 12/2007 | Todd et al. |
| 2007/0284011 A1 | 12/2007 | Freyer et al. |
| 2007/0286682 A1 | 12/2007 | Freyer et al. |
| 2008/0017376 A1 | 1/2008 | Badalamenti et al. |
| 2008/0066912 A1 | 3/2008 | Freyer et al. .................. 166/297 |
| 2008/0078561 A1 | 4/2008 | Chalker et al. ................. 166/387 |
| 2008/0220991 A1 | 9/2008 | Slay et al. |
| 2009/0308616 A1 | 12/2009 | Wylie et al. |

FOREIGN PATENT DOCUMENTS

| | | |
|---|---|---|
| EP | 1 978 071 A1 | 10/2008 |
| GB | 2 411 918 A | 9/2005 |
| WO | 03/008756 A1 | 7/2001 |
| WO | WO 03/042489 A2 | 5/2003 |
| WO | WO03/071094 A1 | 8/2003 |
| WO | 2004/057715 A1 | 7/2004 |
| WO | 2004/101951 A1 | 11/2004 |
| WO | 2004/101952 A1 | 11/2004 |
| WO | WO2004/101951 A1 | 11/2004 |
| WO | WO2005/073504 A1 | 8/2005 |
| WO | WO 2006/008490 A1 | 1/2006 |
| WO | 2006/053896 A1 | 5/2006 |
| WO | WO2006/065144 A1 | 6/2006 |
| WO | 2429725 A | 3/2007 |

OTHER PUBLICATIONS

Bosma, et al., "Design Approach to Sealant Selection for the Life of the Well," Society of Petroleum Engineers, SPE 56536, pp. 1-14, 1999.

Kleverlaan, et al., "Deployment of Swelling Elastomer Packers in Shell E&P," Society of Petroleum Engineers, SPE/IADC 92346, pp. 1-5, 2005.

Kennedy, et al., "The Use of Swell Packers as a Replacement and Alternative to Cementing," Society of Petroleum Engineers, SPE 95713, pp. 1-4, 2005.

Laws, et al., "PDOB's Proactive Approach to Solving a Zonal Isolation Challenge in Harweel HP Wells Using Swell Packers," Society of Petroleum Engineers, IADC/SPE 100361, pp. 1-7, 2006.

Antonio, et al., "Swelling Packer Technology Eliminates Problems in Difficult Zonal Isolation in Tight-Gas Reservoir Completion," Society of Petroleum Engineers, SPE 107578, pp. 1-4, Apr. 15, 2007.

Keshka, et al., "Practical Uses of Swellable Packer Technology to Reduce Water Cut: Case Studies From the Middle East and Other Areas," Society of Petroleum Engineers, SPE 108613, pp. 1-10, Sep. 4, 2007.

Halliburton brochure entitled "Cement Assurance™ MC Tool", Oct. 2007.

Halliburton brochure entitled "Cement Assurance™ MA Tool", Oct. 2007.

Halliburton brochure entitled "Cement Assurance™ HE Tool", Oct. 2007.

Halliburton brochure entitled "WellLife® Cementing Service", Aug. 2006.

EPO Examination Report (08 806 627.9-1213), dated Oct. 25, 2011.

* cited by examiner

METHODS OF INTEGRATING ANALYSIS, AUTO-SEALING, AND SWELLABLE-PACKER ELEMENTS FOR A RELIABLE ANNULAR SEAL

BACKGROUND

The present invention relates to subterranean cementing, and more specifically, in one or more embodiments, to the integration of analysis, auto-sealing, and swellable-packer elements to improve the reliability of an annular seal.

Cement compositions may be used in a variety of subterranean applications. For example, in subterranean well construction, a pipe string (e.g., casing, liners, expandable tubulars, etc.) may be introduced into a well bore and cemented in place. The process of cementing the pipe string in place is commonly referred to as "primary cementing." In a typical primary cementing method, a cement composition may be pumped into an annulus between the walls of the well bore and exterior surface of the pipe string disposed therein. The cement composition should set in the annular space, thereby forming an annular sheath of hardened, substantially impermeable cement (i.e., a cement sheath) that may support and position the pipe string in the well bore and may bond exterior surface of the pipe string to the subterranean formation. Among other things, the cement sheath surrounding the pipe string functions to form an annular seal, preventing the migration of fluids in the annulus, as well as protecting the pipe string from corrosion.

Once set, the cement sheath may be subjected to a variety of cyclic, shear, tensile, impact, flexural, and/or compressive stresses that may lead to failure of the cement sheath. Such failure may be the result of fractures, cracks, and/or debonding of the cement sheath from the pipe string and/or the formation. Undesirably, cement-sheath failure may lead to loss of zonal isolation, resulting, for example, in the undesirable migration of fluids between formation zones. This may lead to undesirable consequences such as lost production, costly remedial operations, environmental pollution, hazardous rig operations resulting from unexpected fluid flow from the formation caused by the loss of zonal isolation, and/or hazardous production operations. Furthermore, failure of the cement sheath also may be caused by forces exerted by shifts in subterranean formations surrounding the well bore, cement erosion, and repeated impacts from the drill bit and the drill pipe.

SUMMARY

The present invention relates to subterranean cementing, and more specifically, in one or more embodiments, to the integration of analysis, auto-sealing, and swellable-packer elements to improve the reliability of an annular seal.

In one embodiment, the present invention provides a method of cementing comprising: introducing a pipe string into a well bore such that an annular space is defined between the pipe string and a wall of the well bore, wherein an annular structure is coupled to the pipe string, and wherein the annular structure comprises an expandable material; and introducing a cement composition into the annular space, wherein the cement composition comprises cement, water, and a component capable of responding to a crack formed in the cement composition after setting to inhibit flow of fluid through the crack.

In one embodiment, the present invention provides a method of cementing comprising: choosing a cement composition based at least partially on an analysis of well incidents, wherein the cement composition comprises cement, water, and a swellable elastomer; introducing a pipe string into a well bore such that an annular space is defined between the pipe string and a wall of the well bore, wherein a plurality of annular structures are spaced along the pipe string, and wherein each of the annular structures comprises a swellable material that swells upon contact with an oleaginous fluid; introducing the cement composition into the annular space; and allowing the cement composition to set in the annular space.

In one embodiment, the present invention provides a method of cementing comprising: determining well characteristics; determining well events; determining cement data for each cement composition of a group of cement compositions; determining total maximum stress differences for each cement composition of the group of cement compositions using the cement data; determining effective cement compositions from the group of cement compositions, wherein the determining comprises comparing the well characteristics and the total maximum stress differences to the cement data from each cement composition of the group of cement compositions; determining risk of cement failure for each of the effective cement compositions; and selecting one of the effective cement compositions, wherein the selected effective cement composition comprises cement, water, and a component capable of responding to a crack formed in the selected effective cement composition after setting to inhibit flow of fluid through the crack; introducing a pipe string into a well bore such that an annular space is defined between the pipe string and a wall of the well bore, wherein an annular structure is coupled to the pipe string, and wherein the annular structure comprises an expandable material; introducing the selected effective cement composition into the annular space; and allowing the selected effective cement composition to set in the annular space.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to subterranean cementing, and more specifically, in one or more embodiments, to the integration of analysis, auto-sealing, and swellable-packer elements to improve the reliability of an annular seal. One of the many advantages of the present invention is that the integration of analysis, auto-sealing, and swellable-packer elements should result in a more reliable annular seal than has previously been obtained. Indeed, it is believed that the synergistic effects obtained from integrating the analysis, auto-sealing, and swellable-packer elements should result in an improved annular seal as compared to separate use of any one of these elements. In addition, similar synergistic effects may also be obtained by integrating two or more of these elements, such as by integrating auto-sealing and swellable-packer elements.

In accordance with embodiments of the present invention, an element for improving the reliability of an annular seal comprises choosing a cement composition based at least on an analysis of well incidents, such as well operations, on the annular seal. By analyzing these well incidents, a cement composition may be chosen that should be more capable of withstanding these well incidents and, thus, maintaining an annular seal. In accordance with embodiments of the present invention, another element for improving the reliability of an annular seal comprises including an auto-sealing component in the cement composition. Among other things, the auto-sealing component should be capable of responding to a crack in the cement sheath to inhibit fluid flow through the crack. Accordingly, the auto-sealing component may prevent the loss of zonal isolation in spite of the formation of cracks in the cement sheath and/or micro-annulus between the cement sheath and pipe string or the formation. In accordance with embodiments of the present invention, another element to improve the reliability of an annular seal comprises disposing a swellable-packer element on the pipe string. Among other things, the swellable-packer element may prevent the loss of zonal isolation by expanding to seal an annulus between the swellable-packer element and the cement sheath when contacted by fluid in the space.

As set forth above, an element for improving the reliability of an annular seal comprises choosing a cement composition based at least on an analysis of well incidents, such as well operations, that may occur over the life of the well on the annular seal. By analyzing these well incidents, a cement composition may be chosen that may have the mechanical properties sufficient to withstand the well incidents, thereby potentially maintaining zonal isolation for the life of the well. Additional considerations in choosing the cement composition include, for example, concerns that the cement composition be stable under downhole conditions and resist downhole chemicals. An example technique for choosing a cement composition is described in U.S. Pat. No. 6,697,738, the relevant disclosure of which is incorporated herein by reference.

Figure 1:
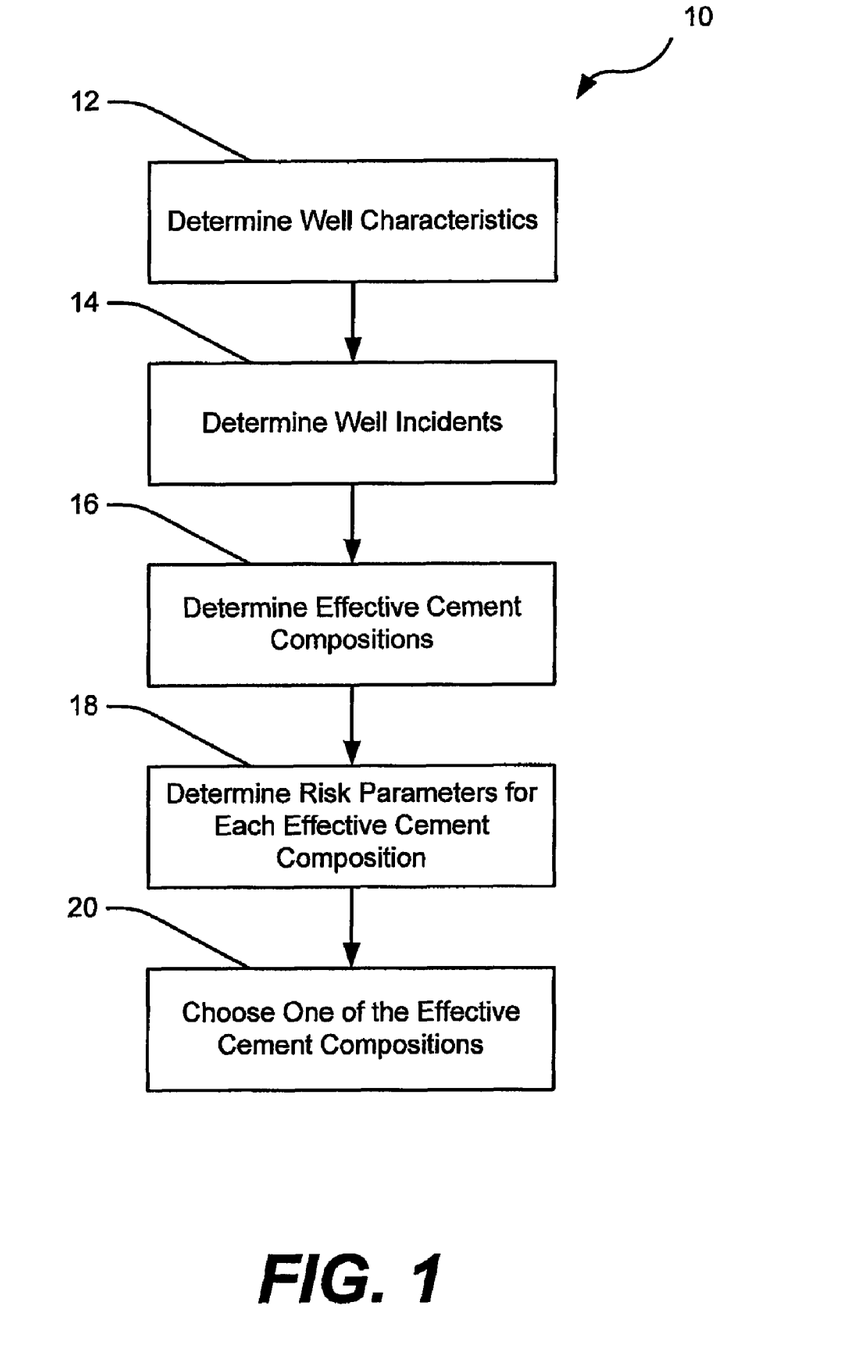
FIG. 1 is a flowchart illustrating a method of choosing a cement composition based on at least an analysis of well incidents on the annular seal, in accordance with embodiments of the present invention.

Referring now to FIG. 1, a flowchart is illustrated that depicts an embodiment of a method for choosing a cement composition based at least on an analysis of well incidents, generally referenced by numeral 10. In one embodiment, method 10 may comprise determining well characteristics for a particular well, depicted in block 12; determining well incidents applicable to the well, depicted in block 14; determining effective cement compositions, depicted in block 16; determining risk parameters for each of the effective cement compositions, depicted in block 18; and choosing one of the effective cement compositions, depicted in block 20.

In block 12, well characteristics for a particular well may be determined, in accordance with embodiments of the present invention. Well characteristics include routinely measurable or calculable parameters of a well, including, but not limited to, vertical depth of the well, overburden gradient, pore pressure, maximum and minimum horizontal stresses, hole size, casing outer diameter, casing inner diameter, density of drilling fluid, desired density of cement slurry for pumping, density of completion fluid, and top of cement. As will be discussed in greater detail with reference to block 14, the well can be computer modeled. In modeling, the stress state in the well at the end of drilling, and before the cement slurry is pumped into the annular space, affects the stress state for the interface boundary between the rock and the cementing composition. Thus, the stress state in the rock with the drilling fluid is evaluated, and properties of the rock such as Young's modulus, Poisson's ratio, and yield parameters are used to analyze the rock stress state. These terms and their methods of determination are well known to those skilled in the art. It is understood that well input data will vary between individual wells.

In block 14, the well incidents for the particular well may be determined, in accordance with embodiments of the present invention. Examples of well incidents include, but are not limited to, cement hydration, pressure testing, well completions, hydraulic fracturing, hydrocarbon production, fluid injection, perforation, subsequent drilling, formation movement as a result of producing hydrocarbons at high rates from unconsolidated formation, and tectonic movement after the cement composition has been pumped into place. Well events include those events that are certain to happen during the life of the well, such as cement hydration, and those events that are readily predicted to occur during the life of the well, given a particular well's location, rock type, and other factors well known in the art.

Those of ordinary skill in the art, with the benefit of this disclosure, will appreciate that each well incident is associated with a certain type of stress, for example: cement hydration is associated with shrinkage; pressure testing is associated with pressure; well completions, hydraulic fracturing, and hydrocarbon production are associated with pressure and temperature; fluid injection is associated with temperature; formation movement is associated with load; and perforation and subsequent drilling are associated with dynamic load. Accordingly, each type of stress can be characterized by an equation for the stress state, referred to herein as "well event stress states."

Generally, the stress state of a cement composition, both before and after hydration, may impact the long-term integrity of the cement sheath. Among other things, the integrity of the cement sheath may depend on the shrinkage and Young's modulus of the cement composition. The stress state of the cement compositions may be determined, both before and after hydration. Since the elastic stiffness of the cement composition evolves in parallel with the shrinkage process, the total maximum stress difference of a cement composition may be calculated using the following formula:

$$\Delta \sigma_{sh} = k \int_{\varepsilon_{sh(set)}}^{\varepsilon_{sh(total)}} E_{(\varepsilon_{sh})} \cdot d\varepsilon_{sh}$$

wherein $\Delta \sigma_{sh}$ is the maximum stress difference due to shrinkage; k is a factor depending on the Poisson ratio and the boundary conditions; $E_{(\varepsilon_{sh})}$ is the Young's modulus of the cement depending on the advance of the shrinkage process; and $\varepsilon_{sh}$ is the shrinkage at a time (t) during setting or hardening.

Those of ordinary skill in the art, with the benefit of this disclosure, will appreciate that the integrity of the cement sheath during subsequent well incidents is associated with the initial stress state of the cement composition. Tensile strength experiments, unconfined and confined tri-axial experimental tests, hydrostatic and odometer tests may be used to define the material behavior of different cement compositions, and hence the properties of the resulting cement sheath. Such experimental measurements are complementary to conventional tests such as compressive strength, porosity, and permeability. From the experimental measurements, the Young's modulus, Poisson's Ratio, and yield parameters such as the Mohr-Coulomb plastic parameters (i.e. internal friction angle, "θ", and cohesiveness, "c"), are all known or readily determined (collectively "the cement data"). Yield parameters can also be estimated from other suitable material models such as Drucker Prager, Modified Cap, and Egg-Clam-Clay. Of course, the present embodiment can be applied to any cement composition, as the physical properties can be measured, and the cement data determined.

In block 16, effective cement compositions from a group of cement compositions may be determined, in accordance with embodiments of the present invention. In certain embodiments, the well characteristics and the well event stress states may be compared to the cement data for each of the cement compositions to determine the effect of the well incidents on the integrity of the cement sheath during the life of the well for each of the cement compositions. In this manner, the cementing compositions that would be effective for sealing the subterranean zone and their capacity from its elastic limit may be determined. In one embodiment, Finite Element Analysis may be used to assess the integrity of the cement sheath during the life of the well. One example of a software program that can accomplish this is the WELLLIFE software program, available from Halliburton Energy Services, Duncan, Okla. The WELLLIFE software program is built on the DIANA Finite Element Analysis program, available from TNO Building and Construction Research, Delft, the Netherlands. For the comparison, all the cement compositions are assumed to behave linearly as long as their tensile strength or compressive shear strength is not exceeded. The material modeling adopted for the undamaged cement is a Hookean model bounded by smear cracking in tension and Mohr-Coulomb in the compressive shear. Shrinkage and expansion (volume change) of the cement compositions are included in the material model. Step 16 may conclude by determining which cement compositions would be effective in maintaining the integrity of the resulting cement sheath for the life of the well.

In block 18, risk parameters for each of the effective cement compositions may be determined, in accordance with embodiments of the present invention. For example, even though a cement composition is deemed effective, one cement composition may be more effective than another. In one embodiment, the risk parameters may be calculated as percentages of cement competency during the determination of effectiveness in block 16.

In block 20, one of the effective cement compositions may be chosen for use in cementing the well. In certain embodiments, the risk parameters determined in block 18 allow a cost-benefit analysis to be performed. As will be appreciated, each of the effective cement compositions has a readily calculable monetary cost. In certain embodiments, the cement compositions may be equally efficacious, yet one may be less expensive. In these instances, the less-expensive cement composition may be chosen. In certain embodiments, one cement composition may be more efficacious and also more expensive. In these instances, a cost-benefit analysis may be utilized to choose one of the effective cement compositions. For example, a less-expensive cement composition may be chosen that has an acceptable risk.

Accordingly, a cement composition may be chosen based at least on an analysis of well incidents, such as well operations, that may occur over the life of the well on the annular seal. In some instances, however, the cement sheath may be subjected to unexpected well operations and/or events. For example, the expected well operations may not have been defined very well, the actual well operations may be different from the expected well operations when performing this analysis, or conditions may change sufficiently to require operations outside of the original design. Accordingly, despite the above-described analysis, cracks in the cement sheath and/or micro-annulus between the cement sheath and the pipe string or the formation may occur. Those of ordinary skill in the art, with the benefit of this disclosure, will appreciate that the cracks and/or micro-annulus may result in an undesired loss of zonal isolation.

To counteract this potential loss of zonal isolation due to the formation of cracks and/or micro-annulus, an auto-sealing component may be included in the cement composition, in accordance with embodiments of the present invention. As described above, the auto-sealing component should be capable of responding a crack in the cement sheath to inhibit fluid flow through the crack. For example, the auto-sealing component may respond to fluid flow (e.g., swell) in the crack to inhibit fluid flow through the crack. Accordingly, the auto-sealing component may prevent the loss of zonal isolation in spite of the formation of cracks and/or micro-annulus. It is believed that the synergistic effects from integrating the auto-sealing component with the above-described analysis should result in an improved annular seal as compared to separate use of either of these elements.

Any of a variety of suitable auto-sealing components may be utilized in accordance with embodiments of the present invention. One example of a suitable auto-sealing component includes a swellable elastomer. As used herein, an elastomer is characterized as swellable when it swells upon contact with an oleaginous (e.g., natural gas, oil, etc.) and/or an aqueous fluid (e.g., water). Among other things, the inclusion of a swellable elastomer may help to maintain zonal isolation, for example, by swelling when contacted by oleaginous or aqueous fluids to seal any cracks in the cement sheath and/or micro-annulus between the cement sheath and the pipe string or formation that may be created.

Swellable elastomers suitable for use in embodiments of the present invention may generally swell by up to about 500% of their original size at the surface. Under downhole conditions, this swelling may be more, or less, depending on the conditions presented. For example, the swelling may be at least 10% at downhole conditions. In some embodiments, the swelling may be up to about 200% under downhole conditions. However, as those of ordinary skill in the art, with the benefit of this disclosure, will appreciate, the actual swelling when the swellable elastomer is included in a cement composition may depend on, for example, the concentration of the swellable elastomer included in the cement composition. Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1- bicyclo heptene (polynorborneane), alkylstyrene, and crosslinked substituted vinyl acrylate copolymers. Examples of suitable elastomers that swell when in contact with aqueous fluid include, but are not limited to, nitrile rubber (NBR), hydrogenated nitrile rubber (HNBR, HNS), fluoro rubbers (FKM), perfluoro rubbers (FFKM), tetrafluorethylene/propylene (TFE/P), starch-polyacrylate acid graft copolymer, polyvinyl alcoholcyclic acid anhydride graft copolymer, isobutylene maleic anhydride, acrylic acid type polymers, vinylacetate-acrylate copolymer, polyethylene oxide polymers, carboxymethyl cellulose type polymers, starch-polyacrylonitrile graft copolymers and the like, polymethacrylate, polyacrylamide, and non-soluble acrylic polymers. Combinations of suitable swellable elastomers may also be used. One example of a suitable swellable elastomer includes WELLLIFE 665 additive, available from Halliburton Energy Services, Inc., Duncan, Okla. Other swellable elastomers that behave in a similar fashion with respect to oleaginous fluids or aqueous fluids also may be suitable. Those of ordinary skill in the art, with the benefit of this disclosure, will be able to select an appropriate swellable elastomer for use in the compositions of the present invention based on a variety of factors, including the application in which the composition will be used and the desired swelling characteristics.

Where used, the swellable elastomer generally may be included in the cement compositions in an amount sufficient to provide the desired mechanical properties. In some embodiments, the swellable elastomer may be present in the cement compositions in a range of about 0.5% to about 50% by weight of the cement ("bwoc"), alternatively in a range of about 1% to about 20% bwoc, and alternatively in a range of about 4% to about 15% bwoc.

In addition, the swellable elastomer that is utilized may have a wide variety of shapes and sizes of individual particles suitable for use in accordance with embodiments of the present invention. By way of example, the swellable elastomer may have a well-defined physical shape as well as an irregular geometry, including the physical shape of platelets, shavings, fibers, flakes, ribbons, rods, strips, spheroids, hollow beads, toroids, pellets, tablets, or any other physical shape. In some embodiments, the swellable elastomer may have a particle size in the range of about 5 microns to about 1,500 microns. In some embodiments, the swellable elastomer may have a particle size in the range of about 20 microns to about 500 microns. However, particle sizes outside these defined ranges also may be suitable for particular applications.

Another example of a suitable auto-sealing component includes encapsulated cement particles. Because the cement particles are encapsulated, they generally should not hydrate until after a delay period. Among other things, the inclusion of the encapsulated cement particles may help to maintain zonal isolation, for example, by hydrating when contacted by aqueous fluids to seal any cracks and or micro-annulus that may be created in the cement sheath. Examples of the cement particles that may be encapsulated include, but are not limited to, hydraulic cements that set and harden by reaction with water, such as Portland cements, pozzolanic cements, gypsum cements, calcium-phosphate cements, high-alumina-content cements, silica cements, high-alkalinity cements, and mixtures thereof. In certain embodiments, the cement particles may be encapsulated with a degradable material that does not release the cement particles into the cement composition until after a delay period. For example, the encapsulation may allow the cement particles to remain dry so that the cement particles do not hydrate until they come into contact with water after their release from encapsulation. In certain embodiments, the encapsulating material may not degrade to release the cement particles into the composition for at least six hours in a high-pH environment. Examples of suitable encapsulating materials include degradable polymers. Examples of suitable encapsulated cement particles are described in U.S. Pat. No. 7,036,586, the relevant disclosure of which is incorporated herein by reference.

Accordingly, the auto-sealing component may be utilized to maintain the annular seal, for example, by sealing cracks in the cement sheath and/or micro-annulus between the cement sheath and the pipe string or formation that may be form. In some instances, however, a poor annular seal may still develop between the cement sheath and the pipe string. For example, the auto-sealing component may not be capable of sealing the cracks and/or annulus that form between the pipe string and the cement sheath. Alternatively, in certain embodiments, debonding of the cement sheath from the pipe string may occur, resulting in the loss of the annular seal. In addition, the cement composition may not initially form a suitable annular seal, in certain embodiments. While this is not desired, the cement composition may not completely fill the annulus between the formation and the pipe string due to, for example, drilling fluid present in the annulus. If the drilling fluid remains in the annulus during setting of the cement composition, a channel containing the drilling fluid may be cemented in place, potentially resulting in an undesirable annular seal. Those of ordinary skill in the art, with the benefit of this disclosure, will appreciate that this lack of an annular seal between the cement sheath and the pipe string may result in an undesired loss of zonal isolation.

Accordingly, a swellable-packer element may be included on the pipe string to, for example, improve the reliability of the annular seal and, thus, counteract this potential loss of zonal isolation. As described above, the swellable-packer element should be capable of swelling to seal an annulus between the swellable-packer element and the cement sheath when contacted by fluid flowing through the annulus. Examples of suitable swellable-packer elements include the CEMENT ASSURANCE TOOL HE TOOL and the CEMENT ASSURANCE TOOL MC TOOL, available from Halliburton Energy Services, Inc. In general, the swellable-packer element generally should remain dormant when encased in the cement sheath. However, once an annulus opens between the cement sheath and the pipe string, such as from debonding of the cement sheath, the swellable-packer element should swell to seal the annulus. In addition, the swellable-packer element may also swell to seal an annulus between the cement sheath and the pipe string that may be cemented in place, such as due to drilling fluid remaining in the well bore.

Accordingly, the swellable-packer element may be able to maintain zonal isolation when the use of the above-described analysis and auto-sealing elements alone could not. Indeed, it is believed that the synergistic effects obtained from integrating the analysis, auto-sealing, and swellable-packer elements should result in an improved annular seal as compared to separate use of either of these elements. For example, if the swellable-packer elements were used by themselves they may have no re-sealing value when the seal failure is due to internal cracks in the cement sheath. Conversely, the auto-sealing components may not re-heal an annulus formed when the pipe debonds from the cement sheath by more than a few microns, but the swellable-packer element could provide that degree of expansion.

Figure 2:
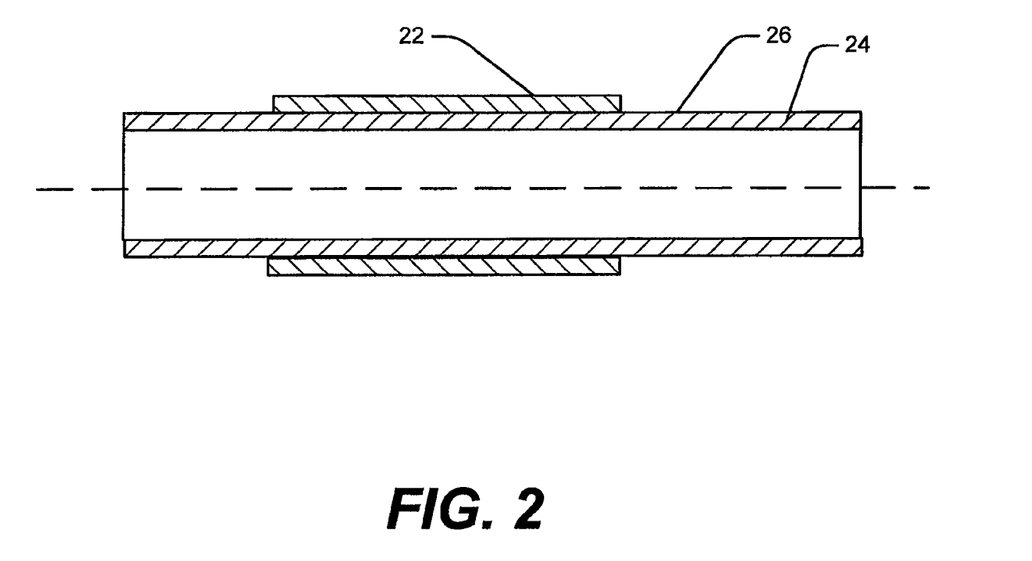
FIGS. 2 and 3 illustrates swellable-packer elements disposed on a pipe string, in accordance with embodiments of the present invention.

Referring now to FIG. 2, a section of a pipe string that includes a swellable-packer element is illustrated, in accordance with one embodiment of the present invention. In the illustrated embodiment, annular structure 22 is coupled to section 24 of the pipe string. In accordance with certain embodiments, the pipe string may be a conventional casing that is typically used in subterranean well construction.

As illustrated, the swellable-packer element includes annular structure 22 that is coupled to exterior surface 26 of section 24 of the pipe string. In certain embodiments, annular structure 22 may be bonded onto exterior surface 26. By way of example, annular structure 22 may be vulcanized directly onto exterior surface 26. In the illustrated embodiment, annular structure 22 generally comprises an expandable material that should expand after placement into a well bore. In certain embodiments, the expandable material may comprise a swellable material that may expand, due to swelling upon contact with a fluid, such as water, oil, gas, or other suitable fluids. In certain embodiments, the expandable material may comprise a diffusible material that may expand due to diffusion of the fluid into openings in the swellable material. Accordingly, annular structure 22 comprising the expandable material should be capable of expanding to seal an annulus between itself and the cement sheath when contacted by fluid flowing through the annulus.

In certain embodiments, the expandable material may include a swellable material that may swell upon contact with a fluid, such as water, oil, gas, or other suitable fluids. Examples of suitable swellable materials that may swell upon contact with a fluid include, but are not limited to, elastic polymers, such as EPDM rubber, styrene/butadiene, natural rubber, ethylene/propylene monomer rubber, styrene/propylene/diene monomer rubber, ethylene/vinyl acetate rubber, hydrogenated acrylonitrile/butadiene rubber, acrylonitrile/butadiene rubber, isoprene rubber, chloroprene rubber, polynorbornene, and combinations thereof. In certain embodiments, the swellable material may further comprise additional dissolved or mixed-in materials, such as cellulose fiber. In certain embodiments, the swellable material may comprise a mixture of a rubber with another material, such as polyvinyl chloride, methyl methacrylate, acrylonitrile, ethyl acetate, or other polymers which will expand on contact with oil.

As described above, the expandable material may include a diffusible material that expands due to diffusion of a fluid into openings in the materials. By way of example, the diffusible material may include a foam-like material that is compressed before being placed into the well bore. The foam-like material may include a number of closed cavities. Over time, fluid may diffuse though the material filling the cavities and expanding the material. Accordingly, the expandable material may expand to seal an annulus that may be present between the cement sheath and the pipe string. Examples of suitable diffusible materials include, but are not limited to, nitrile rubber.

In addition to the expandable material, annular structure 24 may also comprise a reinforcing material to, for example, improve the mechanical properties of annular structure 24. Examples of suitable reinforcing materials, include, but are not limited to, fiber cloth.

Annular structure 22 should have a sufficient thickness to provide the desired expansion properties. In certain embodiments, annular structure 22 may have a thickness in the range of 0.0625 inch to about 5 inches. In certain embodiments, annular structure 22 may have a thickness up to about 0.5 inch. Those of ordinary skill in the art, with the benefit of this disclosure, will understand that the appropriate thickness of annular structure 22 will depend on a number of factors, including the diameter of the pipe string and the composition of the expandable material.

In the illustrated embodiment, annular structure 22 is disposed along a length of section 24 of the pipe string. By way of example, annular structure 22 may have a length in the range of about 1 foot to about 10 feet, and, alternatively, in the range of about 1 foot to about 4 feet. In one embodiment, annular structure 22 may have a length of about 3 feet. It should be understood, however, that annular structures (such as annular structure 22) having lengths outside these ranges may be encompassed by the present invention. Those of ordinary skill in the art, with the benefit of this disclosure, will understand that the appropriate length of the pipe string to cover with annular structure 22 will depend on a number of factors including, cost of the expandable material, formation characteristics, and the like.

Figure 3:
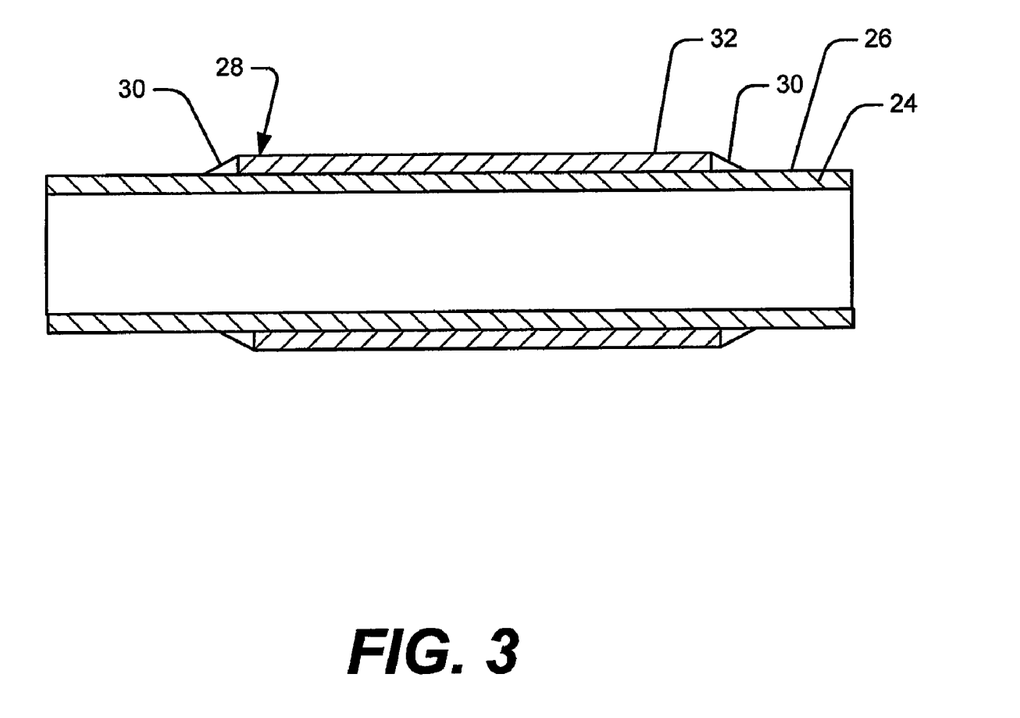

Referring now to FIG. 3, a section of a pipe string that includes a swellable-packer element is illustrated, in accordance with another embodiment of the present invention. In the illustrated embodiment, alternative annular structure 28 is coupled to section 24 of the pipe string. In accordance with certain embodiments, the pipe string may be a conventional casing that is typically used in subterranean well construction.

As illustrated, the swellable-packer element includes alternative annular structure 28 that is coupled to exterior surface 26 of section 24 of the pipe string. Alternative annular structure 28 may be coupled to exterior surface 26 using any suitable technique. By way of example, alternative annular structure 28 may be coupled to section 24 of the pipe string using set screws (not illustrated). In the illustrated embodiment, alternative annular structure 28 generally comprises pair of rings 30 and annular-shaped expandable element 32 located between pair of rings 30. In certain embodiments, annular-shaped expandable element 32 comprises an expandable material that should expand after placement into a well bore. In certain embodiments, the expandable material may comprise a swellable material that may expand, due to swelling upon contact with a fluid, such as water, oil, gas, or other suitable fluids. In certain embodiments, the expandable material may comprise a diffusible material that may expand due to diffusion of the fluid into openings in the swellable material. Accordingly, alternative annular structure 28 comprising the expandable material should be capable of expanding to seal an annulus between itself and the cement sheath when contacted by fluid flowing through the annulus. Examples of suitable expandable materials are described in more detail above with respect to FIG. 2.

Annular-shaped expandable element 32 should have a sufficient thickness to provide the desired expansion properties. In certain embodiments, annular-shaped expandable element 32 may have a thickness in the range of 0.0625 inch to about 5 inches. In certain embodiments, annular-shaped expandable element 32 may have a thickness up to about 0.5 inch. Those of ordinary skill in the art, with the benefit of this disclosure, will understand that the appropriate thickness of annular-shaped expandable element 32 will depend on a number of factors, including the diameter of the pipe string and the composition of the expandable material.

In the illustrated embodiment, alternative annular structure 28 is disposed along a length of section 24 of the pipe string. By way of example, alternative annular structure 28 may have a length in the range of about 1 foot to about 10 feet, and, alternatively, in the range of about 1 foot to about 4 feet. In one embodiment, alternative annular structure 28 may have a length of about 3 feet. It should be understood, however, that annular structures (such as alternative annular structure 28) having lengths outside these ranges may be encompassed by the present invention. Those of ordinary skill in the art, with the benefit of this disclosure, will understand that the appropriate length of the pipe string to cover with alternative annular structure 28 will depend on a number of factors including, cost of the expandable material, formation characteristics, and the like.

Figure 4:
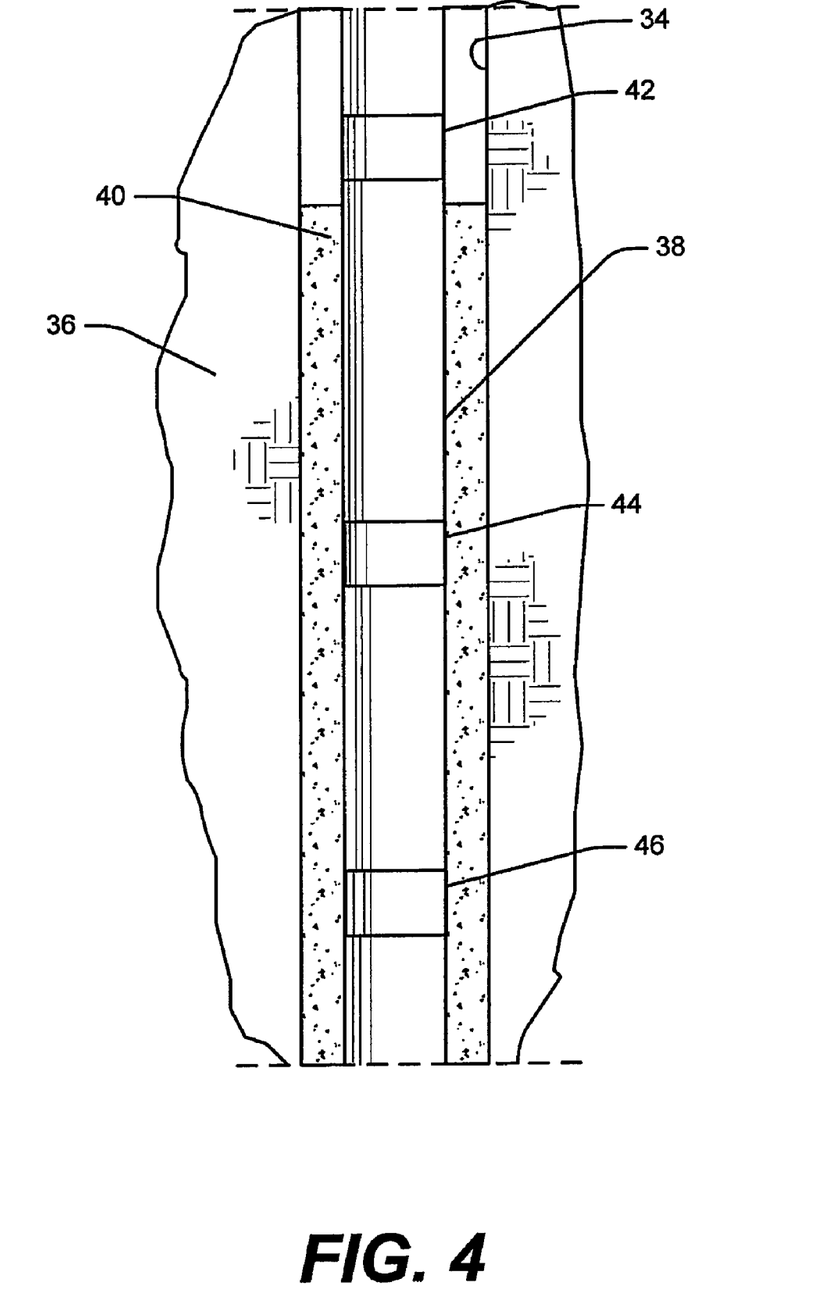
FIG. 4 illustrates a pipe string that is disposed in a well bore and includes a swellable-packer element disposed thereon, in accordance with embodiments of the present invention.

Referring now to FIG. 4, a partial cross-sectional view of a pipe string that is disposed in a well bore and includes swellable-packer elements disposed thereon is illustrated, in accordance with embodiments of the present invention. In the illustrated embodiment, the well bore is generally indicated by numeral 34. As illustrated, well bore 34 penetrates subterranean formation 36. While well bore 34 is depicted as a generally vertical well bore, the methods of the present invention may be performed in generally horizontal, inclined, or otherwise formed portions of well bores. In addition, well bore 34 may include multilaterals, for example, wherein well bore 34 may be a primary well bore having one or more branch well bores extending therefrom, or well bore 34 may be a branch well bore extending laterally from a primary well bore.

As illustrated, pipe string 38 may be inserted into well bore 34 and cemented in place. To cement pipe string 38 in place, a cement composition comprising water and cement may be pumped into an annulus between subterranean formation 36 and pipe string 38. The cement composition should set in the annulus, thereby forming cement sheath 40. Among other things, cement sheath 40 may support and position pipe string 38 in well bore 34 and bond pipe string 38 to subterranean formation 36. As previously discussed, the cement composition generally should comprise an auto-sealing component that should be capable of responding to fluid flow through a crack in cement sheath 40 to inhibit fluid flow through the crack, in certain embodiments. Accordingly, the auto-sealing component may prevent the loss of zonal isolation due to the formation of cracks in the cement sheath 40 and/or microannulus between the cement sheath 40 and the pipe string 38 or subterranean formation 36. In addition, as also previously discussed, the cement composition may be chosen based at least on an analysis of the well incidents, such as well operations, on the annular seal, in certain embodiments. By analyzing these well incidents, a cement composition may be chosen that should be more capable of withstanding these well incidents and, thus, maintain an annular seal.

In the illustrated embodiment, swellable-packer elements 42, 44, and 46 (such as annular structure 22 and alternative annular structure 28) may be disposed on pipe string 38. As illustrated, swellable-packer elements 42, 44, and 46 are spaced along pipe string 38. The swellable-packer elements 42, 44, and 46 may be placed at any number of positions in well bore 34. For example, swellable-packer elements 42, 44, and 46 may be placed near multi-lateral junctions, perforations, faults, at or above the top of cement sheath 40, between formation zones (such as between an oil-producing zone and a water-producing zone), and other portions of well bore 34 where long-term zonal isolation may be desired. As illustrated, swellable-packer element 42 may be placed on a portion of pipe string 38 that is not encased within cement sheath 40, such as above the top of cement sheath 40.

Figure 5:
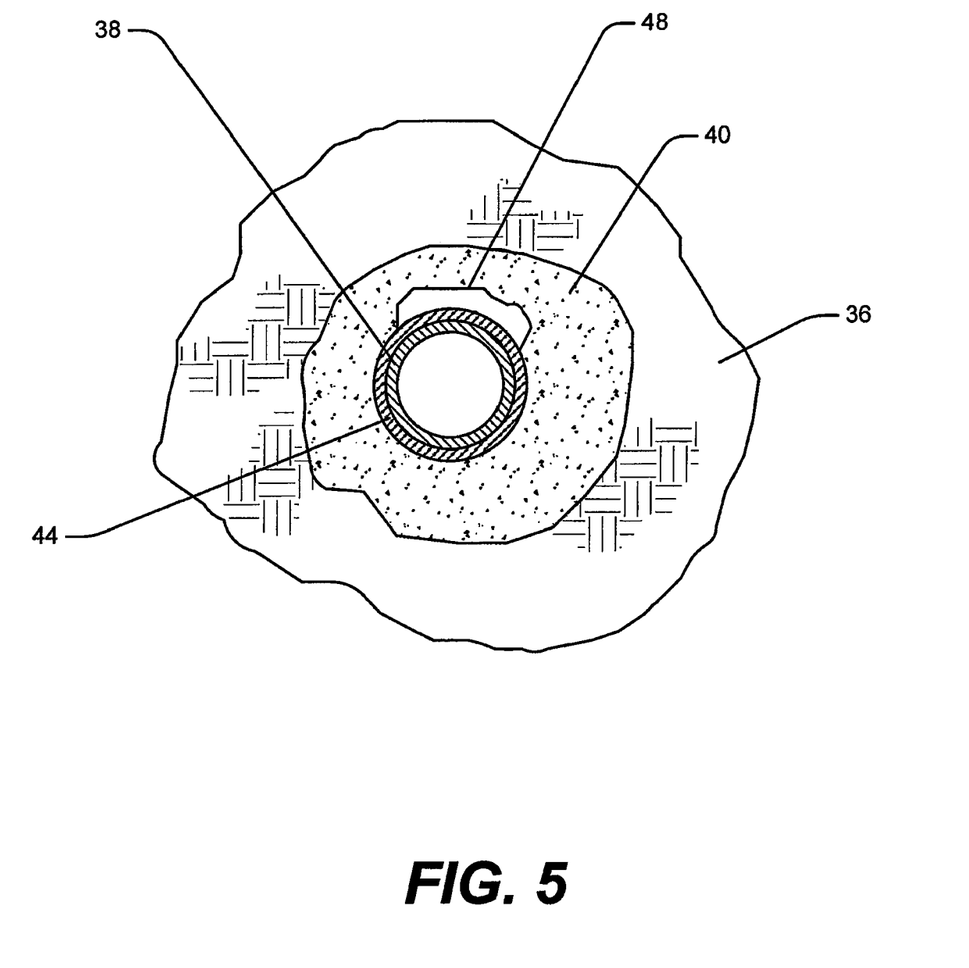
FIGS. 5 and 6 illustrate expansion of a swellable-packer element to seal an annulus between a pipe string and a cement sheath, in accordance with embodiments of the present invention.
Figure 6:
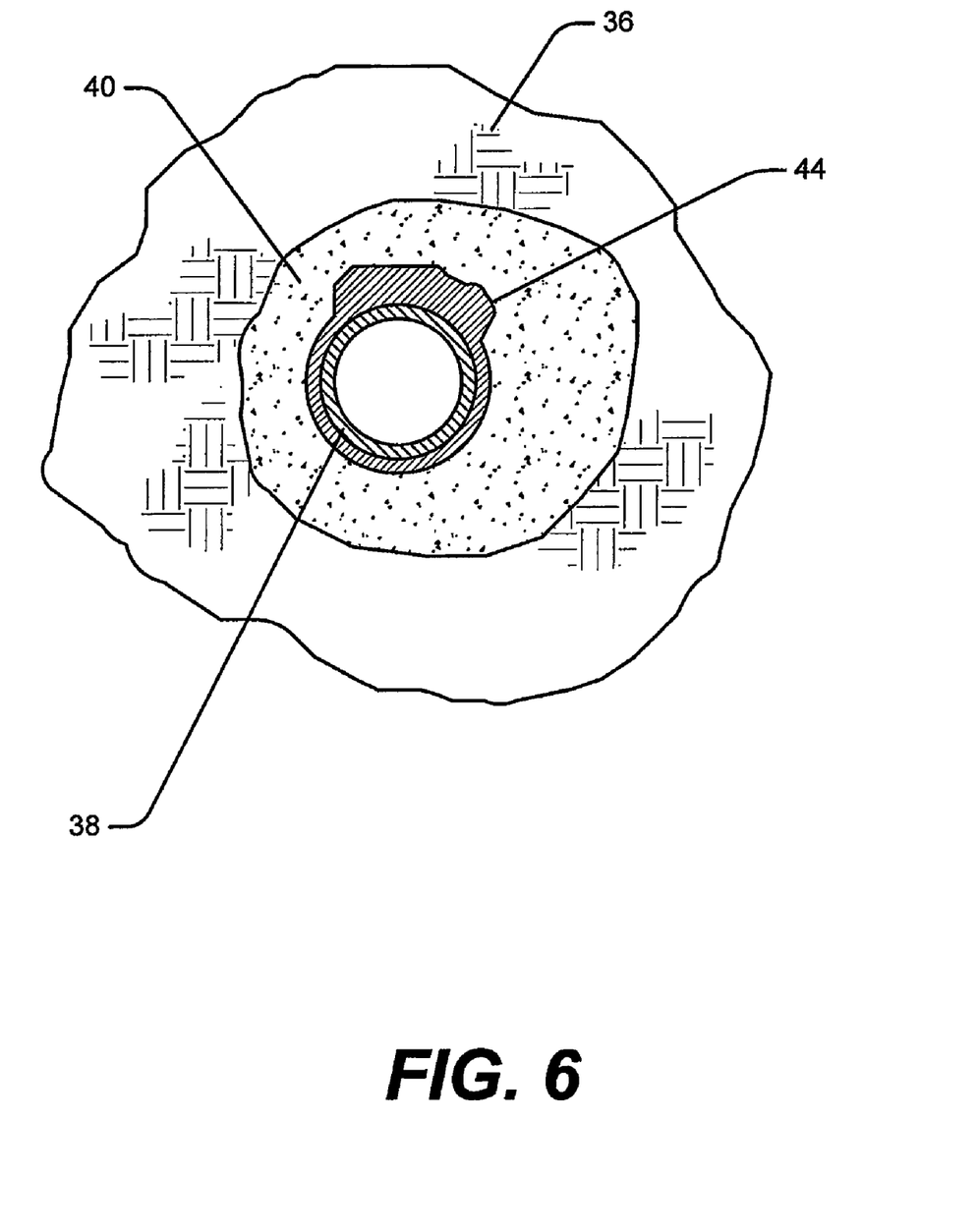

Among other things, swellable-packer elements 42, 44, and 46 may prevent the loss of zonal isolation, for example, by swelling to seal a space between swellable-packer elements 42, 44, and 46 and cement sheath 40 when contacted by fluid flowing through the space. By way of example, FIG. 5 illustrates cement sheath 40 having become de-bonded from swellable-packer element 44 to form space 48 therebetween. Among other things, this space 48 may result in an undesired loss of zonal isolation. As illustrated by FIG. 6, swellable-packer element 44, when contacted by fluid in space 48, should expand to fill space 48 and, thus, seal space 48 to fluid flow.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of cementing comprising:
choosing a cement composition based at least partially on an analysis of well incidents;
introducing a pipe string and an annular structure into a well bore such that an annulus is defined between the pipe string and a wall of the well bore, wherein the annular structure, having a solid form before being introduced into the well bore, is coupled to the pipe string and comprises an expandable material; and
introducing the cement composition into the annulus, wherein the cement composition comprises cement, water, and an auto-sealing component to seal a crack formed in the cement composition after the cement composition has hardened, and wherein the annular structure is adapted to seal a space formed between the cement composition and the pipe.

2. The method of claim 1 wherein choosing the cement composition comprises determining a total maximum stress difference for the cement composition using data from the cement composition.

3. The method of claim 2 wherein choosing the cement composition comprises comparing well characteristics and the total maximum stress difference.

4. The method of claim 1 wherein the auto-sealing component comprises at least one component selected from a group consisting of: a swellable elastomer, an encapsulated cement particle, and any combination thereof.

5. The method of claim 1 wherein the auto-sealing component comprises at least one swellable elastomer selected from a group consisting of:
natural rubber; acrylate butadiene rubber; polyacrylate rubber; isoprene rubber; choloroprene rubber; butyl rubber; brominated butyl rubber; chlorinated butyl rubber; chlorinated polyethylene; neoprene rubber; styrene butadiene copolymer rubber; sulphonated polyethylene; ethylene acrylate rubber; epichlorohydrin ethylene oxide copolymer; ethylene-propylene rubber; ethylene-propylene-diene terpolymer rubber; ethylene vinyl acetate copolymer; fluorosilicone rubbers; silicone rubbers; polynorborneane; alkylstyrene; a crosslinked substituted vinyl acrylate copolymer; nitrile rubber; hydrogenated nitrile rubber; fluoro rubbers; perfluoro rubbers; tetrafluorethylene/propylene; starch-polyacrylate acid graft copolymer; polyvinyl alcoholcyclic acid anhydride graft copolymer; isobutylene maleic anhydride; an acrylic-acid-type polymer; vinylacetate-acrylate copolymer; polyethylene oxide polymer; carboxymethyl-cellulose-type polymer; starch-polyacrylonitrile graft copolymer; polymethacrylate; polyacrylamide; non-soluble acrylic polymer; and any combination thereof.

6. The method of claim 1 wherein the auto-sealing component comprises a swellable elastomer that swells upon contact with a fluid selected from a group consisting of: an oleaginous fluid, an aqueous fluid, and any combination thereof.

7. The method of claim 1 wherein the auto-sealing component comprises a swellable elastomer present in a range of about 0.5% to about 50% by weight of the cement present in the cement composition.

8. The method of claim 1 wherein the annular structure is bonded to an exterior surface of the pipe string.

9. The method of claim 1 wherein the annular structure comprises a pair of rings and an annular-shaped expandable element located between the pair of rings, wherein the annular-shaped expandable element comprises the expandable material.

10. The method of claim 1 wherein the expandable material comprises a material selected from a group consisting of: a swellable material, a diffusible material, and any combination thereof.

11. The method of claim 1 wherein one or more additional annular structures comprising the expandable material are spaced along the pipe string.

12. The method of claim 1 further comprising allowing the cement composition to form a cement sheath wherein the auto-sealing component is capable of inhibiting fluid flow through a failure structure in the cement sheath, wherein the failure structure comprises at least one failure structure selected from a group consisting of: a fracture, a crack, a micro-annulus, and any combination thereof.

13. The method of claim 1 wherein the annular structure is a swellable-packer element.

14. A method of cementing comprising:
determining well characteristics;
determining well events;
determining cement data for each cement composition of a group of cement compositions;
determining total maximum stress differences for each cement composition of the group of cement compositions using the cement data;
determining effective cement compositions from the group of cement compositions, wherein determining comprises comparing the well characteristics and the total maximum stress differences to the cement data from each cement composition of the group of cement compositions;
determining risk of cement failure for each of the effective cement compositions;
selecting one of the effective cement compositions, wherein the selected effective cement composition comprises cement, water, and an auto-sealing component to seal a crack formed in the selected effective cement composition after the selected effective cement composition has hardened;
introducing a pipe string and an annular structure into a well bore such that an annulus is defined between the pipe string and a wall of the well bore, wherein the annular structure, having a solid form before being introduced into the well bore, is coupled to the pipe string and comprises an expandable material;
introducing the selected effective cement composition into the annulus; and
allowing the selected effective cement composition to set in the annulus to form a cement sheath;
wherein the annular structure is adapted to seal a space formed between the cement sheath and the pipe string.

15. The method of claim 14 wherein the auto-sealing component comprises at least one component selected from a group of components consisting of: a swellable elastomer, an encapsulated cement particle, and any combination thereof.

16. The method of claim 14 wherein the auto-sealing component is capable of inhibiting fluid flow through a failure structure in the cement sheath, wherein the failure structure comprises at least one failure structure selected from a group consisting of: a fracture, a crack, a micro-annulus, and any combination thereof.

* * * * *